Oct. 7, 1969   R. F. SHANNON   3,470,977
FIRE RESISTANT GLASS FIBERBOARD AND METHOD OF MAKING SAME
Filed Feb. 21, 1968   2 Sheets-Sheet 1
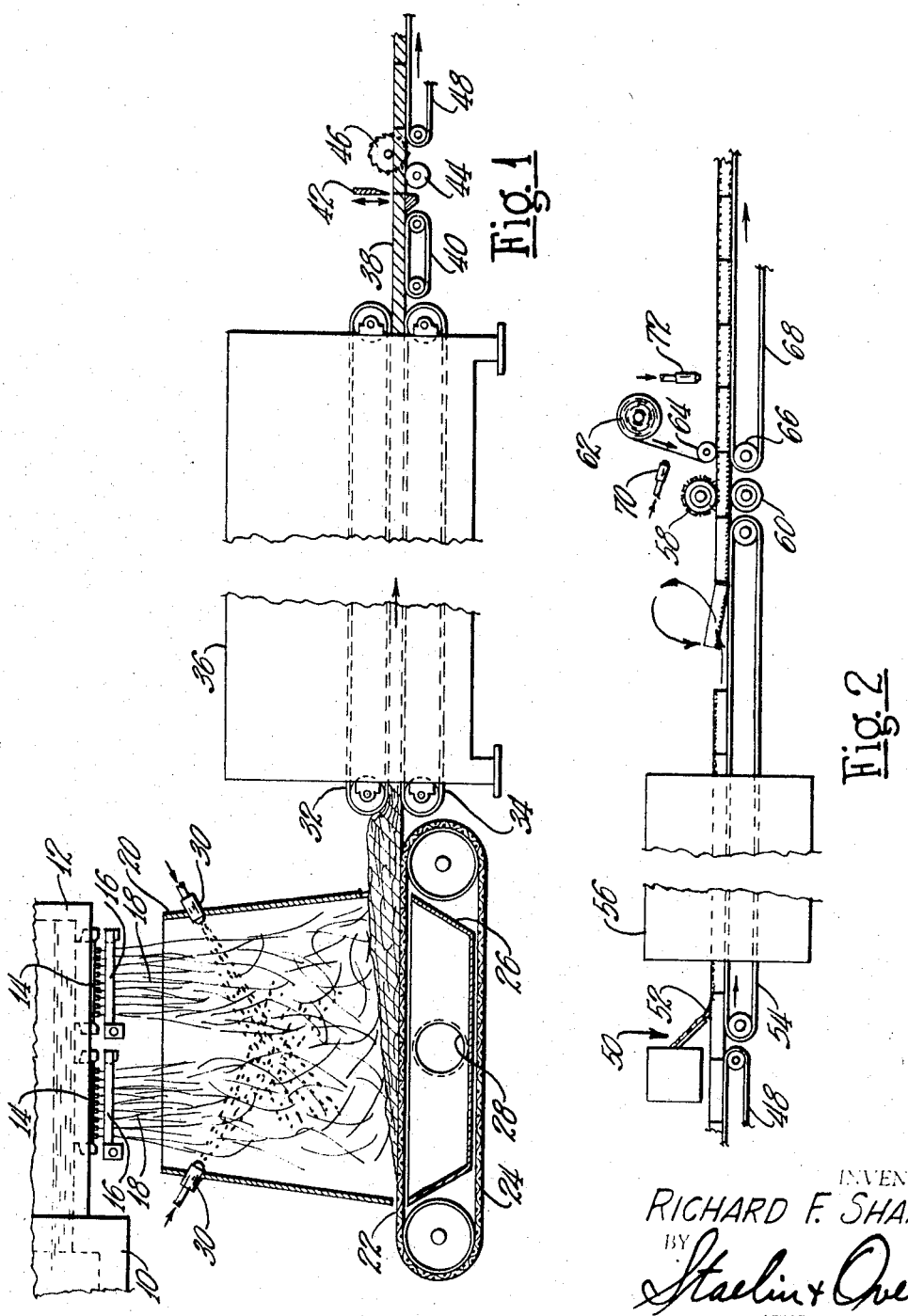
INVENTOR
RICHARD F. SHANNON
BY
Staelin & Overman
ATTORNEYS Oct. 7, 1969  R. F. SHANNON  3,470,977
FIRE RESISTANT GLASS FIBERBOARD AND METHOD OF MAKING SAME
Filed Feb. 21, 1968  2 Sheets-Sheet 2

INVENTOR.
RICHARD F. SHANNON
BY
*Staelin + Overman*
ATTORNEYS

United States Patent Office 3,470,977
Patented Oct. 7, 1969

3,470,977
FIRE RESISTANT GLASS FIBERBOARD AND METHOD OF MAKING SAME
Richard F. Shannon, Lancaster, Ohio, assignor to Owens-Corning Fiberglas Corporation, a corporation of Delaware
Filed Feb. 21, 1968, Ser. No. 707,194
Int. Cl. G01k *11/04;* E04b *1/99*
U.S. Cl. 181—33    8 Claims

ABSTRACT OF THE DISCLOSURE

A fire resistant glass fiber acoustical board which does not appreciably delaminate when exposed to temperatures above 1000° F. and which has a life of over 2 hours when subjected to the Fire Underwriter's Laboratory test described in their Report R3583–2. The boards contain generally randomly oriented slits approximately ⅛ inch deep in their front face.

BACKGROUND OF THE INVENTION

One type of acoustical, or sound attenuating board suitable for use as room sidewall and ceiling surfaces, is made by bonding glass fibers together with a nonthermoplastic binder. In one method of making such a product, glass fibers are sucked down upon the top surface of a foraminous conveyer which causes a high percentage of the fibers to lay flat in an otherwise random orientation. The fibers fall upon the conveyer in groups which are oriented as above described, and groups of the fibers are deposited on top of each other until a build up of a desired thickness is achieved. The fibers, therefore, build up in a generally horizontal layered structure with some of the fibers of each layer interlocking with those of the adjacent layer. The fibers are held in this condition by a nonthermoplastic binder which in most instances is a phenol formaldehyde thermoset resin. The binder can be sprayed onto the fibers prior to the time that they fall upon the conveyer surface, or can be sprayed onto the mat after it is collected on the conveyer. Alternatively, the mat that is formed on the conveyer can be immersed in the binder material and the excess binder sucked or otherwise removed from the mat. When phenol formaldehyde thermosetting resins are used as the binder, they are applied to the fibers in the form of a dilute water solution, droplets of which collect at the crossover points of the fibers. The mat with the binder solution thereon is then held compressed to a predetermined density and the binder cured in this condition to form a board. The boards have good acoustical properties and those used to make ceiling board have a density of approximately 12 pounds per cubic foot, while those used to make ceiling tile have a density of approximately 11.5 pounds per cubic foot. Since the only combustible material in these boards is a small percent of an organic binder, the boards produced as above described have the very desirable property of being fire resistant.

The fire resistance of the glass fiber acoustical board is limited however by the melting of the glass fiber. Melting of the fibers can be controlled, however, by applying a devitrifying agent to the fibers of the mat, and when this is done, a ¾ inch thick board will withstand a fire rating test which will later be described for one hour. When a dense coating of fire resistant material is applied to the back side of the board, the board will then withstand the conditions of the fire test for two hours. The fire resistance of the glass fiberboard is, therefore, so great that the acoustical board can be depended upon as the sole barrier for the prevention of the spread of flames to other areas of the building in which the material is installed. The Board of Fire Underwriters approves glass fiber acoustical boards for this purpose, and has given the board one hour and two hour ratings depending upon the board's ability to withstand certain test conditions for the rated periods. The Fire Underwriter's test which the acoustical boards must withstand is specified in the National Fire Underwriter Laboratories, Inc. Report R3583–2 entitled "Acoustical Tile in a Floor and Ceiling Construction," Jan. 5, 1962.

Glass fiber acoustical board is able to withstand the test conditions of the above report for periods of time depending upon the treatment which is given the glass fibers and/or acoustical board. Glass fibers soften at a temperature of about 1200° F., whereas the flame conditions which the board must withstand reach a temperature of approximately 1800° F. The glass fibers are made to be capable of withstanding temperatures above their normal softening point by a devitrification process which occurs in situ when the fibers are subjected to the elevated temperatures. Acoustical board having a one hour fire rating is conventionally made by spraying a minor amount of a devitrifying agent on the fibers along with the binder that is used in making the acoustical board. Suitable devitrifying agents are: aluminum, magnesium or alkaline earth metal ions in the form of a silicate or oxide and will include asbestine, wollastonite and talc. Other metal oxides such as titanium oxide, zirconium oxide, calcium oxide, barium oxide, iron oxide, etc., or materials which form the oxides can be used. The devitrifying agents are preferably used in an amount more than approximately 2 percent and usually in an amount of approximately 10 percent of the weight of the glass fibers. A three-quarter inch thick acoustical board whose fibers are coated with approximately 10 percent of the devitrifying agent will withstand the above mentioned fire test for a period of approx. one hour. Before the end of the hour test, however, delamination of the board starts, following which a progressive deterioration occurs and the board falls apart by its own weight at the end of approximately 50 minutes.

The same acoustical board containing a devitrifying agent prepared as above described can have its fire resistance extended to two hours by impregnating the back side of the board with a dense layer of first resistant materials such as is formed by a mixture containing ball clay, feldspar and colloidal silica. This impregnation should be to a depth of ⅛ inch or more to form a rigid backing which provides improved structural integrity to the board. The amount of fire resistant impregnant usually comprises approximately 0.4 pound per square foot of board. The impregnation treatment is described in my application Ser. No. 457,984 filed May 24, 1965, now Patent No. 3,286,785.

Another type of fire resistant acoustical board product which is made is called a tile and comprises 12″ x 12″, 12″ x 24″ or 24″ x 24″ squares of the glass fiberboard first described. These tile have kerfs sawed into their side edges for receiving T-shaped structural members which support the tile. These tile containing kerfs are impregnated with approximately 0.65 pound per square foot of surface with the same fire resistant coating material above described, which coating material is sucked down into the region in which the kerf is formed so that the structural member fitting into the kerf is protected by the impregnating material. These tile also have a UL fire rating of two hours.

The acoustical tile, and the two types of acoustical board above described will usually have their front faces painted to provide a pleasing appearance, and in some instances may have a "Mylar" thin plastic sheet applied thereto so that the surfaces can be washed easily. When subjected to fire, the "Mylar" films burn off quickly, and the paint usually chips and peels during the first few minutes of the exposure to heat. All three products, however, appear to fail by a delamination process wherein the non-impregnated regions of the board delaminate progressively and fall off following which the impregnated backing gradually disintegrates and falls to pieces by its own weight.

An object of the present invention is the provision of new and improved glass fiber acoustical products of the type above described which will have a further increase in fire rating above that previously described for the same products.

SUMMARY OF THE INVENTION

It has been discovered, that the ability of glass fiber ceiling and wall board to withstand exposure to fire without delamination can be increased by approximately one-half hour for a 2 foot by 4 foot board and more than one hour for a one foot square tile if short slits running in various directions and approximately ⅛ inch to ⅜ inch deep are cut into the front face of the board. The reasons for this improvement were not first apparent, but it now appears that a shallow skin of devitrified material is formed on exposures to elevated temperatures, and that inwardly from this devitrified layer, the glass fibers are still in a plastic and undevitrified state. It also appears that the devitrification of the surface layer is accompanied by shrinkage and that this shrinkage puts stress upon the softened plasttic fibers immediately beneath the layer, and which attach the layer to the remainder of the board. The short generally closed slits do not appear to be healed by the devitrification process. It appears that the slits help to decrease the disturbance of the softened fibers by which the devitrified layer is held intack. Very little, if any, gap exists between the sides of the slits so that the slits do not initially open up the surface of the baord to expose the inner regions of the board to the fire. All the reasons for the improvement are not fully understood, but it is believed that a critical time lag in the devitrification process is achieved which prolongs the adhesive of the surface layer until the fibers which hold the surface layer in place have had a chance to change from a softened glassy state to a stronger devitrified state that is better able to hold the surface layer in position.

BRIEF DESCRIPTION OF THE DRAWINGS

FIGURE 1 is a side elevational view, with portions in section, of apparatus for producing glass fiberboard embodying principles of the present invention;

FIGURE 2 is a continuation of the apparatus shown in FIGURE 1;

DESCRIPTION OF THE PREFERRED EMOBIDMENTS

Figure 3:
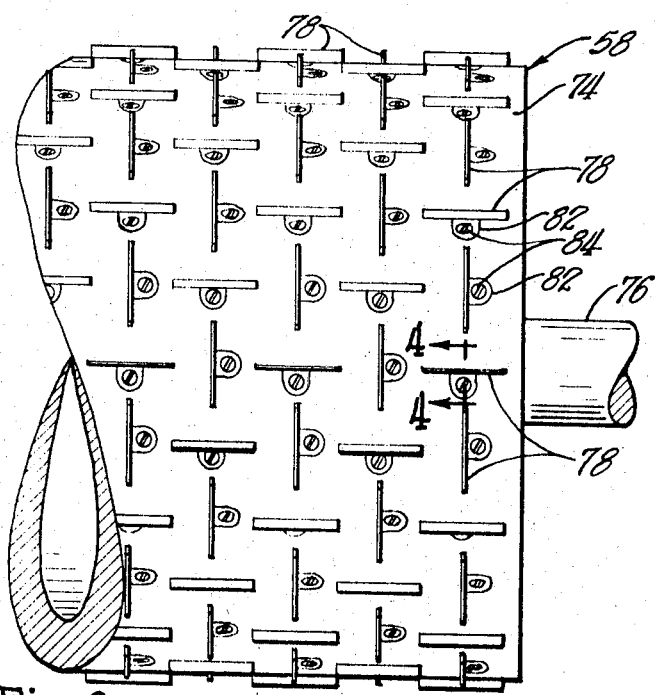
FIGURE 3 is an enlarged fragmentary view of the slotting apparatus shown in FIGURE 2.

The apparatus shown in FIGURES 1 and 2 for forming acoustical board generally comprises a glass furnace 10 having a forehearth 12 the bottom floor of which is provided with metal plates 14 having a plurality of openings therein through which molten glass flows in small streams. Immediately beneath the plates 14 are longitudinal bars 16 having longitudinal slits therein through which steam issues to impinge upon the glass streams and attenuate them into tiny glass fibers. Glass fibers 18 so produced are projected downwardly by the jets of steam into a forming hood 20 which is positioned over the top flight 22 of a horizontal conveyer 24. The horizontal conveyer 24 is foraminous, and a suction pan 26 is positioned beneath the top flight 22 to withdraw steam and air flow out of the forming hood 20 and cause the glass fibers to form a mat on the top flight 22 of the horizontal conveyer. An opening 28 is provided in the suction pan 26 for communication with an exhaust fan, not shown. A plurality of nozzles 30, only two of which are shown, spray an aqueous solution of binder into the forming hood to coat the fibers with a binder which can later be cured.

The binder impregnated mat is transferred from the horizontal forming conveyer 24 to between compression surfaces formed by parallel flights of top and bottom endless conveyers 32 and 34 respectively. The endless conveyers 32 and 34 compress the binder impregnated mat to predetermined density and transport the mat while in this compacted condition through a drying and curing oven 36. The binder in the mat is transformed into a thermoset condition which holds the fibers in their compressed condition to produce a rigid board structure having a density usually between 5 and 20 pounds per cubic foot, depending upon the degree of compaction used in the drying and curing oven. The transfer conveyer 40 moves the board 38 to a cut off blade 42 which is reciprocated vertically to chop the continuous board 38 into predetermined lengths. A transfer roll 44 is positioned downstream of the cut off blade 40 for moving the sections of board between a pair of vertical saws 46, only one of which is shown which trim off opposite edge portions of the board. The second transfer conveyer 48 then moves the trimmed sections to a coating station 50 where a layer of mastic material 52 is applied to the top surface of the board sections for reasons which will later be explained. The mastic material 52 is usually a mixture of clay and other materials, made plastic by the addition of water, and the coated board sections are then transferred by another conveyer 54 through a drying oven 56 which drys the plastic material into a hard coating.

The boards are then flipped over to expose their uncoated surface and are transferred to between the bite of a pair of top and bottom opposing rolls 58 and 60. The top roll 58 has a plurality of short knives projecting therefrom which cuts slits in alternate directions in the as yet uncoated surface of the board for reasons which will later be expalined. The surface slitted board can then be given various decorative treatments one of which is to apply a thin layer of plastic over the slitted surface. In one such treatment, a roll of Mylar plastic film is uncoiled from a roll 62 and passed beneath a compression roll 64 that is positioned above the tail pulley 66 of a fourth transfer conveyer 68.

A coating of adhesive is applied to the bottom of the Mylar film by some suitable means as for example the spray nozzle 70. In some instances the Mylar film can be colored to form the finished decorative surface or it can be painted as by spray nozzles 72. Alternatively, the slitted top surface of the board can be painted directly by the spray nozzle 72 to provide a finished surface without the Mylar coating. The boards are then suitably separated and shipped for installation as the ceiling structures for buildings.

Figure 4:
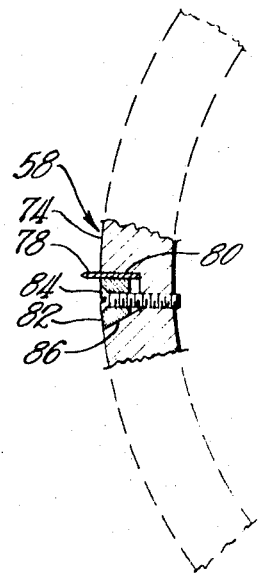
FIGURE 4 is a fragmentary sectional view taken approximately on the line 4—4 of FIGURE 3.

FIGURES 3 and 4 show one type of slit producing roll 58 which can be used. The roll 58 is a hollow drum having a smooth cylindrically shaped outer surface 74, and an axially extending shaft 76, only one of which is shown, and by which it is rotatably driven by means not shown. A plurality of short knife edges 78 approximately 1 inch long extend in alternate directions with adjacent parallel knives being 2 inches apart. The knife edges are secured to the cylindrical surface 74 of the drum 58 in any suitable manner. As shown in the drawings, the knife edges 78 are positioned in correspondingly shaped slots 80 cut in the surface of the drum, and are biased to one side edge of the slot 80 by a hold down wedge 82 which is in turn held in place by a machine screw 84. A tapered recess 86 is provided adjacent one side edge of the slot 80 to receive the tapered hold down wedge 82.

Figure 5:
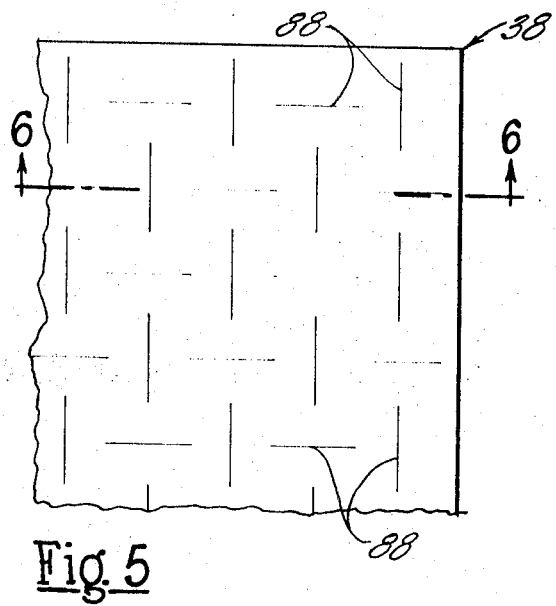
FIGURE 5 is a fragmentary plan view of an acoustical board produced by the apparatus shown in FIGURES 1 and 2.
Figure 6:
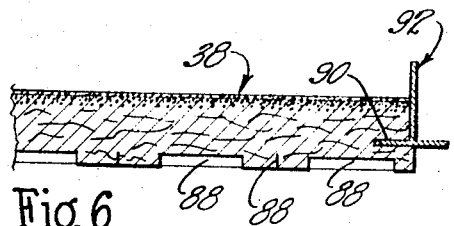
FIGURE 6 is a sectional view taken approximately on the line 6—6 of FIGURE 5.

Glass fiberboard which is passed between the rolls 58 and 60 have their fibers adjacent the outer surface of the board, cut by the knife edges 78 to a depth which depends upon the spacing of rolls 60 and 58. FIGURES 5 and 6 of the drawings show the slit arrangement that is provided in glass fiberboard by the roll 58. The slits 88 extend in alternate directions and are desirably to a depth between ⅛ and ⅜ inch, and preferably ¼ inch but can be deeper for reasons which will later be explained. Adjacent generally parallel slits may be spaced as close as ¼ inch apart and as far apart as 6 inches. Preferably over 50 percent of the fibers should be at a length less than approximately 2 inches. FIGURE 6 shows a construction of ceiling tile that has a kerf 90 in its side edge and into which the side of a T-shaped bar 92 projects to support the tile. The products whose side edges are kerfed will be hereafter called tile, and the products whose side edges are not kerfed will be hereafter called board.

While the invention will be hereafter described with reference to board made of glass fibers which devitrify when exposed to elevated temperatures, it will be understood that the principles of the invention will have application with respect to boards made of any type of fibers which shrink and/or soften when exposed to elevated temperatures. The following examples describe various types of glass fiberboard products which embody principles of the present invention.

Example 1

A glass fiber acoustical board weighing 11½ pounds per cubic foot and comprising 12 percent of resin solids was made from glass fiber having the following composition:

| | |
|---|---|
| $SiO_2$ | 55.83 |
| $CaO$ | 20.17 |
| $MgO$ | 6.98 |
| $Al_2O_3$ | 5.53 |
| $Na_2O_3$ | 10.55 |
| $K_2O$ | 0.27 |
| $MnO$ | 0.30 |
| $Fe_2O_3$ | 0.20 |
| $TiO_2$ | 0.17 |

The binder material that was sprayed onto the fibers by the nozzles 30 comprises approximately 60 percent water and 40 percent of a binder material produced as hereinafter described. A reaction vessel was charged with 80 parts of phenol, 123 parts of a 50 percent water solution of formaldehyde, 19.3 parts of water and 12 parts of barium hydrate ($Ba(OR)_2.8H_2O$). The mixture was heated for a total of 7 hours during which time it was stirred by a propeller type agitator. The mixture was first heated to 110° F. and maintained at about such temperature for approximately 2 hours, and was then heated to and held at about 140° F. for the remaining 5 hours, at which time the refractive index of the reaction mixture was 1.4620 and the infrared absorption analysis indicated that it was substantially free of unreactive phenol and also of methylene groups. The reaction products were then cooled to approximately 100° F. and neutralized with sulfuric acid to a pH of about 5.7. A 28 part charge of dicyandiamide was added to the neutralized reaction products and the resulting mixture was heated to and maintained at approximately 140° F. for an additional 1 hour. The reaction products were then cooled to approximately room temperature of 75° F. and neutralized with further sulfuric acid to a pH of approximately 7.4. The finished binder solution is made by taking 10 parts of the above phenolic resin, 2 parts of pinewood pitch extract, 6.8 parts of a 325 mesh asbestine, and 1.7 parts of 325 $TiO_2$ and mixing with 30 parts of water. This binder solution is then sprayed on the fibers as by the nozzles 30. The binder impregnated mat was cured in the oven 36 for 5 minutes at a temperature of 500° F.

The board produced as above described was ⅝ inch thick and had a coating of fire resistant impregnant applied as shown by the coating station 50 in the drawings. The fire resistant coating material comprises a water suspension having 50 percent solids which comprise 47 parts of feldspar, 47 parts of ball clay, 2.7 parts of colloidal silica (solids) and 3.3 parts of a bentonite clay (see Example 1 of application 457,984 supra). The coating material was applied in the amount of 0.4 pound per square foot of board, and was caused to penetrate into the board by approximately ⅛ inch. The board was dried and tested according to the procedure of the Report R3583–2 of Underwriter's Laboratories, Inc., entitled "Acoustical Tile in a Floor and Ceiling Construction," Jan. 5, 1962. The board withstood the test conditions for 2 hours and 5 minutes.

According to the invention, the same type of coated board was turned over and passed beneath the roll 58 so that its exposed surface was slit in the manner shown in FIGURES 5 and 6. A "Mylar" film was applied as shown in FIGURE 2 of the drawings, which Mylar film contained a white pigment and provided the decorative coating of the exposed surface of the board. This slitted board when tested according to the procedure of Report R3583–2, withstood the fire test for 2 hours and 45 minutes.

Example 2

Basic phenol formaldehyde bonded board was produced as given in Example 1 and the board was cut into 12 inch squares to form ceiling tile. The board was ⅝ inch thick and had kerfs cut into each of the four edges midway between the two major surfaces. This ceiling tile, however, differed from the board of Example 1, in that it was impregnated with 0.65 pound of the same impregnant of Example 1 per square foot of the tile. In this instance, the impregnant was pulled by suction to within ⅛ inch of the lower surface by means of a suction pan, not shown in the drawing, below the top flight of the conveyer. The impregnation material, therefore, included the region in which the kerfs were later cut, and the slits 88 extended up to the impregnant from the opposite face of the tile. This tile when supported as shown in FIGURE 6, and when tested according to the procedure of the above referred to report, withstood the test conditions for two hours and 45 minutes. The same tile, without the slits 88, withstands the test conditions for approximately two hours.

Example 3

The basic board 38 of Example 1 was produced and was fire tested without being coated with the impregnant 52. The board was slitted as at 88, and was then painted with a paint containing calcium carbonate and titanium pigments. The slitted board withstood the fire test conditions indicated above for 1½ hours. The same board, but which does not contain the slits 88, withstands the same test conditions for 60 minutes.

The phenolic binder serves the purpose of holding the fibers together at their crossover points to provide a light weight highly porous board. Any type of organic thermosetting resin can be used but phenolics and particularly phenol formaldehydes are preferred because of cost considerations. The asbestine which is used in the binder is a devitrifying agent, and causes the glass fibers to become devitrified when the fiber-board is exposed to elevated temperatures, such as occur during a fire or during the fire test. While asbestine is a preferred material, other magnesium silicates as for example wallastonite, are also very effective. In general, however, any metal oxide as for example zirconium oxide, titanium oxide, calcium oxide, aluminum oxide, iron oxide, chromium oxide, the silicates thereof, or materials which will produce the oxides can be used. Impure forms of these oxides such as talc, asbestos, silica, alumina, Baymal, portland cement, and gypsum also act as devitrifying agents. In general, best results are obtained and a faster devitrification is achieved, when a combination of magnesium silicate and a metal oxide such as titanium oxide is used as a coating material on the fibers as occurs when mixed with the binder resin. The devitrifying materials should be less than approximately 325 mesh US seive series, and should be evenly distributed over the fibers in an amount more than approximately 1 percent of the glass, preferably between 4 percent and 10 percent, and usually 5 or 6 percent by weight of the bare glass.

The paint which is used to provide decorative coating on the surface of the board is not critical and can have any type of organic vehicle and any type of inorganic fillers and pigments. Metal oxides and alkaline earth oxide filler and pigments are beneficial in that they are devitrifying agents. The impregnating material used above, serves the function of sealing off the back surface of the board to prevent flow of hot gases through the board. The layer of impregnating materials also serves the purpose of providing structural integrity to the fibers to help hold the fibers in place even though some become softened at elevated temperatures. Any type of high temperature resistant plastic material made from high temperature inorganic fire resistant materials can be used, provided that they do not deteriorate at the elevated temperatures. Clay is a preferred constituent because of its characteristics at elevated temperatures, and because of its plastic nature when mixed with water. Soluble silicates, as for example silica sol, provide green strength upon drying. Group I and Group II metal aluminosilicates, as for example feldspar, can be used as fluxing agents for the glass fibers and silicates to aid in fusion at elevated temperatures and the production of a refractory material.

All of the reasons for the great improvement in the fire resistance of the tile that is achieved by providing slits in its exposed surface are not completely known. It is believed that the slits relieve stress concentrations that are produced in the surface of the tile or board, as the case might be, when it is exposed to elevated temperatures. The Mylar coating and/or coating of paints are quickly burned off during the initial minutes of exposure to high temperature conditions so that they do not aid or effect the fire rating appreciably. It is believed, however, that a devitrification of the glass fibers occurs starting with the layer of fibers that is adjacent to the exposed surface, and that this devitrification process proceeds toward the opposite surface of the board. It is known that glass fibers shrink when they become devitrified, and so it is believed that the devitrification process causes the front approximately ⅛ inch of fibers to devitrify and shrink down while the fibers immediately inwardly thereof are at a softened temperature. The softened fibers immediately behind the front ⅛ inch layer do not have appreciable strength at the time the front layer is undergoing devitrification, and it is believed that the devitrification of the surface layer pulls and weakens the softened fibers immediately inwardly therefrom.

The process that is used in forming the slits does not remove material from the board, and the resilient nature of the board causes the side surfaces of the slits to generally engage each other and close off the slit opening after the slit forming knives are removed from the board. The slits, therefore, do not provide openings allowing the hot gases to initially reach the inner regions of the board. Only after the surface layer has become devitrified and shrunken, do the side surfaces of the slits move apart. Because the slits are generally closely spaced, the amount of shrinkage between slits is minimized and this in turn minimizes the sizes of the openings produced between the surfaces of the slits during the shrinking process. In addition, the proximity of the slits reduces the tearing action of the fibers which connect the surface devitrified layer to the stiffened back side of the board. Once the interconnecting fibres have undergone at least some devitrification, they become strengthened and thereafter hold the pieces of the now devitrified surface layer in position to act as a heat shield.

While the invention has been described as relating to board made of glass fibers, it is not to be so limited, since the principles will have application to any fibers such as mineral wool, etc, which undergo devitrification.

It will be apparent that the objects heretofore enumerated as well as others have been accomplished and that there has been provided a new and improved fire resistant board the improvement of which is produced by forming slits in alternate or random directions in the surface that is exposed to the elevated temperature conditions.

While the invention has been described in considerable detail, I do not wish to be limited to the particular embodiments shown and described, and it is my intention to cover hereby all novel adaptations, modifications and arrangements thereof which come within the practice of those skilled in the art to which the invention relates.

I claim:
1. A fire resistant acoustical panel comprising: generally randomly oriented glass fibers bonded together by a non-thermoplastic binder, said panel having generally parallel front and back major surfaces, said fibers having a devitrifying agent thereon, and said front surface having substantially closed slits at least approximately ⅛ inch deep distributed throughout to provide discontinuity to the bonded fibers forming the front region of the board.

2. The fire resistant panel of claim 1 wherein said non-thermoplastic binder is a thermoset organic resin.

3. The fire resistant panel of claim 2 wherein said panel includes a fire resistant impregnant extending from said back major surface partially through said panel to leave a front surface generally unprotected by said impregnant, and which front surface contains said slits.

4. The fire resistant panel of claim 3 wherein the side edges of said panel are kerfed in the region of impregnation of said fire resistant impregnant.

5. The method of producing a fire resistant panel comprising: depositing swirls of inorganic fibers onto a surface, applying a devitrifying agent and a curable binder to said fibers, curing said binder to form a slab having opposing front and back major surfaces, and providing short substantially closed slits at least approximately ⅛ inch deep and less than approximately six inches apart in said front face to provide discontinuity of the bonded fibers forming the front face.

6. The method of claim 5 wherein said slits are provided by forcing a member having short sharp knives into the front face of said panel.

7. The method of claim 5 including the step of impregnating the back surface of said slab with a fire resistant material.

8. The method of claim 7 wherein the fibers are glass fibers.

References Cited
UNITED STATES PATENTS

| | | | |
|---|---|---|---|
| 2,581,993 | 1/1952 | Willey | 181—33.11 |
| 2,747,470 | 5/1956 | Jones | 181—33.11 |
| 3,043,733 | 7/1962 | Harmon | 181—33.1 |
| 3,106,983 | 10/1963 | Karpovich | 181—33 |
| 3,286,785 | 11/1966 | Shannon | 181—33 |

JOHN E. MURTAGH, Primary Examine

U.S. Cl. X.R.

52—144; 161—117, 124, 403; 162—109, 120, 156